UNITED STATES PATENT OFFICE.

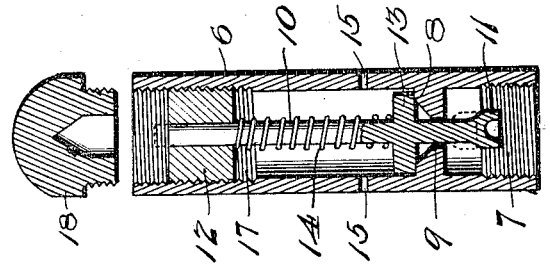
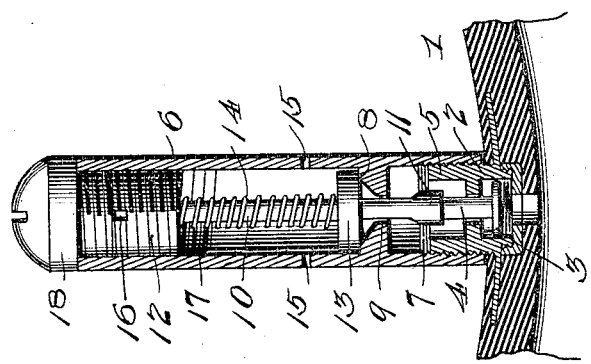
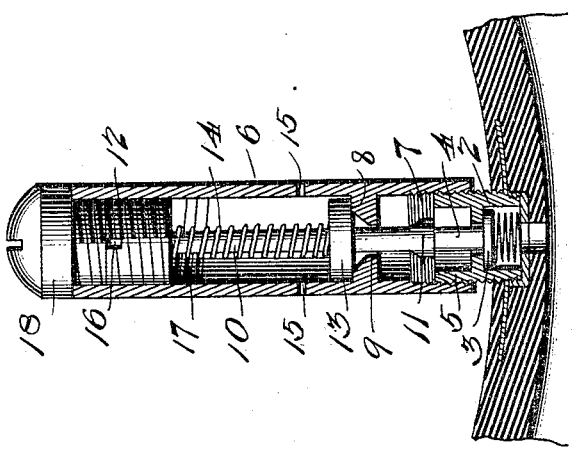

WILLIAM S. ARNOLD, OF SAN FRANCISCO, CALIFORNIA.

SAFETY-VALVE FOR PNEUMATIC TIRES.

No. 837,772.  Specification of Letters Patent.  Patented Dec. 4, 1906.

Application filed June 2, 1906. Serial No. 319,949.

*To all whom it may concern:*

Be it known that I, WILLIAM S. ARNOLD, a citizen of the United States, residing at San Francisco, in the county of San Francisco and State of California, have invented certain new and useful Improvements in Safety-Valves for Pneumatic Tires, of which the following is a specification.

This invention relates to valves for pneumatic tires, and more particularly to a valve for preventing the explosion of such tires.

The object of the invention primarily is to provide a device adapted to be screwed to the threaded portion or nipple of the ordinary inflating-valve of a tire and to act in conjunction with the valve-pin of the tire-valve to prevent explosion of the tire from excessive pressure within, due to the expansion of the air in the tire from heat or from other causes, such as striking a projection or depression in the roadway.

A further object is to so construct the device that it can be readily set to operate at predetermined pressures to relieve the strain on the tire when such predetermined pressure is exceeded.

One of the important and highly desirable features of the invention about to be described with regard to its utility is the construction that permits its application to tire-valves in common use by merely removing the dust-cap and screwing the device thereon, the safety device when applied taking the place of this cap.

Other objects and advantages looking to cheapness, simplicity, and durability are in view and will become apparent in the course of the following description.

In the drawings illustrating the invention, Figure 1 is a section of a portion of a pneumatic tire and valve with the safety device applied, the said device being also in section and occupying a position just before being screwed down into operative engagement with the tire-valve pin, the tire-valve being shown closed. Fig. 2 is a similar view showing the device in its lowest position, with the rod of the safety device in engagement with the pin of the tire-valve, showing said valve open; and Fig. 3 is an enlarged sectional view of the device, showing the raised position of the valve in dotted lines, with the screw-head for closing the upper end of the casing in juxtaposition to the casing.

Referring to the drawings, the numeral 1 indicates an ordinary pneumatic tire fitted with a valve-holder 2 and valve 3, having the usual pin 4 extending up into the threaded nipple 5.

The numeral 6 designates the improved valve-casing, which is interiorly threaded at its lower end, as indicated at 7, which adapts it to be screwed onto the nipple 5. Just above the threaded portion a valve-seat 8 is formed having a central aperture 9 for the easy passage of the valve-rod 10. This valve-rod is preferably provided at its lower end with a slight enlargement 11, having a depression therein in which rests the upper end of the valve 4, and loosely surrounding the upper end of this rod is a screw-plug 12, between which and the valve 13, which is rigidly secured to the rod 10, is a spiral spring 14, that holds the valve 13 seated under normal conditions. The diameter of the valve 13 is a little less than that of the interior of the casing, and the aperture 9 is a little larger than the rod 10, thus allowing the air to pass through the aperture around the rod and through the space between the periphery of the valve and the wall of the casing when the conditions are such as to operate the safety device.

When the pressure in the tire exceeds the predetermined pressure or the pressure above which the device will operate, the tire-valve will be forced upwardly against the rod 10 and, together with the pressure around the tire-valve and beneath the valve 13, will raise said rod and valve 13 against the pressure of the spring 14, thus permitting the air to pass through the aperture 9 around the rod, under the valve, and out of the casing through perforations 15, made in the walls of said casing.

The central opening in the screw-plug 12 is of such size as to permit the valve-rod to pass freely through it, and this plug is further provided with a recess 16 for the reception of a suitable spanner by which the plug is screwed to any position in the threaded portion 17 of the casing. The upper portion of the casing is closed by a screw-head 18, which is readily removable for the purpose of reaching the screw-plug to set it to relieve the pressure on the tire when the same exceeds that which has been predetermined.

The tire is inflated or blown up in the usual manner, the valve therein operating in the ordinary way to prevent the escape of air. Assuming the tire to be blown to sufficient hardness and the pump connections removed, the safety device, which is set to operate at a pressure exceeding that to which the tire has been blown, is secured to the nipple of the tire-valve and takes the place of the valve-cap ordinarily employed. In attaching the safety device as already suggested the tire-valve will be opened; but the pressure in the tire will not be sufficient to operate the valve of the safety device under these conditions and the safety device will merely serve the purpose of the tire-valve, but will be in readiness to operate and relieve the pressure on the tire when the predetermined pressure has been exceeded.

Of course it will be understood that it will be much simpler and cheaper to apply the described device to the nipple of the inflating-valve; but it is obvious that it may be permanently attached to a valve such as that shown and a separate valve of any approved construction used for inflating purposes exclusively, which arrangement would result in turning the whole described device into one used exclusively for safety purposes.

I claim—

1. A safety pressure device for pneumatic tires comprising a detachable casing formed with a valve-seat therein, an air-outlet opening above the seat, a valve on said seat and means for holding said valve seated under normal tire-pressures, means for unseating and holding the tire-valve open to normally establish communication between the tire and the casing below the valve-seat substantially as described.

2. A safety device for pneumatic tires, comprising a detachable casing having means for attaching it to the usual tire-inflation-valve nipple, and having a valve-seat formed therein and an air-outlet opening above the seat, a spring-pressed valve on said seat, means carried by the casing for unseating and holding the tire-valve normally open to establish communication between the tire and the casing below the seat.

3. In combination with the inflating-valve of a pneumatic tire, a casing detachable for the purpose of inflating the tire, said casing having a valve-seat formed therein, the casing being provided with air-outlet openings above the seat, a valve on said seat, a spring pressing upon said valve, means for varying the tension of the spring, and means for unseating and holding the tire-valve normally open, substantially as and for the purposes set forth.

4. The combination with the valve of a pneumatic tire, of a detachable casing, having an air-opening therein and attached to the tire-valve, a valve-seat in said casing having an opening therein, whereby communication between the tire and the casing may be established, a valve on said seat and having a rod in engagement with the tire-valve proper to hold it open, a spring bearing on the valve in the casing to hold it normally closed, and a screw-plug in the top of the casing for tensioning the spring to hold the casing-valve seated at different predetermined tire-pressures.

5. The combination with a valve of a pneumatic tire, of a casing having air-openings therethrough and attached to the tire-valve, a valve-seat in said casing having an opening therein whereby communication between the tire and casing may be established, a screw-plug in the top of the casing, a rod working through said plug and carrying a valve resting on the seat and having an extension engaging the tire-valve proper to hold it open, a spring interposed between the valve and the screw-plug, whereby the valve in the casing is held normally seated, substantially as described.

In testimony whereof I affix my signature in presence of two witnesses.

WILLIAM S. ARNOLD.

Witnesses:
TITIAN W. JOHNSON,
J. JEROME LIGHTFOOT.